United States Patent
Chen

(10) Patent No.: US 9,071,311 B2
(45) Date of Patent: Jun. 30, 2015

(54) METHOD AND ANTENNA SYSTEM FOR SETTING WORKING ANTENNA UNITS

(71) Applicant: Wistron NeWeb Corporation, Hsinchu County (TW)

(72) Inventor: Yung Jinn Chen, Hsinchu County (TW)

(73) Assignee: Wistron NeWeb Corporation, Hsinchu County (TW)

( * ) Notice: Subject to any disclaimer, the term of this patent is extended or adjusted under 35 U.S.C. 154(b) by 55 days.

(21) Appl. No.: 14/144,858

(22) Filed: Dec. 31, 2013

(65) Prior Publication Data

US 2014/0329470 A1 Nov. 6, 2014

(30) Foreign Application Priority Data

May 3, 2013 (TW) .............................. 102115882 A

(51) Int. Cl.
*H04B 17/00* (2006.01)
*H04B 7/06* (2006.01)
*H04B 7/04* (2006.01)

(52) U.S. Cl.
CPC ............ *H04B 7/0691* (2013.01); *H04B 7/0413* (2013.01); *H04B 7/061* (2013.01)

(58) Field of Classification Search
CPC ..... H04B 7/0413; H04B 7/061; H04B 7/0691
USPC .................. 455/67.7, 513, 562.1, 575.7, 446, 455/277.2, 101
See application file for complete search history.

(56) References Cited

U.S. PATENT DOCUMENTS

| 7,573,851 | B2 * | 8/2009 | Xing et al. ..................... 370/334 |
| 7,852,818 | B2 * | 12/2010 | Feder et al. ................... 370/338 |
| 8,284,721 | B2 * | 10/2012 | Chen et al. .................... 370/329 |
| 8,391,322 | B2 * | 3/2013 | Kent et al. ..................... 370/536 |
| 8,654,815 | B1 * | 2/2014 | Forenza et al. ................ 375/141 |
| 8,706,588 | B1 * | 4/2014 | Zhu ................................. 705/35 |
| 8,817,825 | B2 * | 8/2014 | Kent et al. ..................... 370/536 |
| 2010/0093282 | A1 * | 4/2010 | Martikkala et al. .......... 455/63.4 |

(Continued)

FOREIGN PATENT DOCUMENTS

| CN | 101023689 A | 8/2007 |
| TW | 200709591 A | 3/2007 |
| TW | 201132021 A1 | 9/2011 |

OTHER PUBLICATIONS

English Abstract of TW 201132021; two pages.
English Abstract of CN 101023689 (A) from Espacenet; one page.

(Continued)

*Primary Examiner* — Marceau Milord
(74) *Attorney, Agent, or Firm* — John A. Fortkort; Fortkort & Houston P.C.

(57) ABSTRACT

A method is adapted for controlling an antenna system that includes multiple antenna groups, each including multiple antenna units. The method includes: controlling each of the antenna units of each of the antenna groups to receive one and the same test signal; generating, for each antenna unit, a quality indicator, which is associated with a signal quality of the test signal, with reference to the test signal received thereat; and selecting, for each antenna group, one of the antenna units, the quality indicator corresponding to which indicates an optimum signal quality from among the antenna units of the respective antenna group, to be a working antenna unit of the respective antenna group for performing subsequent data transmission.

12 Claims, 3 Drawing Sheets

(56) References Cited

U.S. PATENT DOCUMENTS

2011/0261898 A1* 10/2011 Huang et al. .................. 375/295
2013/0322562 A1* 12/2013 Zhang et al. .................. 375/267

OTHER PUBLICATIONS

English Abstract of TW 200709591; two pages.

Taiwan Search Report which was appended to Taiwan Office Action dated Jan. 9, 2015 in Taiwan counterpart Application No. 102115882; one page.

English translation of Taiwan Search Report which was appended to Taiwan Office Action dated Jan. 9, 2015 in Taiwan counterpart Application No. 102115882; one page.

* cited by examiner

METHOD AND ANTENNA SYSTEM FOR SETTING WORKING ANTENNA UNITS

CROSS REFERENCE TO RELATED APPLICATION

This application claims priority of Taiwanese patent application no. 102115882 filed on May 3, 2013.

BACKGROUND OF THE INVENTION

1. Field of the Invention

The invention relates to a method and an antenna system, more particularly to a method and an antenna system capable of automatically setting optimum antenna units as working antenna units.

2. Description of the Related Art

Multiple-input and multiple output (MIMO) is a common wireless communication technology which is nowadays widely applied to various kinds of communication systems, such as the third-generation of mobile telecommunications (3G) and the fourth-generation of mobile telecommunications (4G). A wireless router is an ordinary example of the application of MIMO technology.

Referring to FIG. 1, a schematic diagram which illustrates an antenna system 9 adopting MIMO technology is provided. The antenna system 9 includes a control circuit 91, a plurality of radio frequency (RF) modules 92, 93 connected electrically to the control circuit 91, a plurality of antenna units 94, 95 connected electrically to the RF module 92, and a plurality of antenna units 96, 97 connected electrically to the RF module 93. The control circuit 91, by means of the RF modules 92, 93, is able to control one of the antenna units 94, 95 and one of the antenna units 96, 97 for wireless signal transmission. For example, the antenna units 94, 96 may be external antennas disposed on an electronic device (e.g., a wireless router), and the antenna units 95, 97 may be internal antennas disposed in the electronic device. When the antenna system 9 which adopts MIMO technology operates to transmit or receive wireless signals, the antenna units 94, 96 must cooperate to form a group for operation, and the antenna units 95, 97 must also cooperate to form a group for operation. However, the antenna system 9 only activates one of the groups of the antenna units at a time.

When a user operates the electronic device, a switch of the electronic device may be utilized to switch between transmission paths, which are constituted respectively by the RF module 92 and the antenna unit 94, the RF module 92 and the antenna unit 95, the RF module 93 and the antenna unit 96, and the RF module and the antenna unit 97, for wireless signal transmission. The user usually selects one of the aforementioned transmission paths according to a subjective usage experience. In other words, when the user considers the wireless transmission efficiency of one of the transmission paths being insufficient, another one of the transmission paths may be selected by the user for transmission in an attempt to promote the transmission efficiency. However, this kind of selection strategy is performed without taking into account objective information associated with network quality, and thus is relatively ineffective.

Moreover, when the antenna system 9 is in operation, since the group of the antenna units 94, 96 and the group of the antenna units 95, 97 are required to work separately, and since the antenna units 94, 95, 96, 97 may not be flexibly adjusted to form different groups for operation (for example, the antenna unit 94 may not cooperate with the antenna unit 97 to form a group for operation), flexibility of matching between the antenna units is restricted, so that performance of the antenna system 9 is adversely influenced.

SUMMARY OF THE INVENTION

Therefore, an object of the present invention is to provide a method for controlling an antenna system. The method is capable of automatically setting an optimum working antenna unit according to an objective quality indicator, and enabling flexible matching between the antenna units of the antenna system so as to achieve better performance.

Accordingly, the method of the present invention is adapted for controlling an antenna system. The antenna system includes a control device and a plurality of antenna groups, each of which includes a plurality of antenna units. The method comprises the steps of:

(A) controlling, using the control device, each of the antenna units of each of the antenna groups to receive one and the same test signal;

(B) generating for each of the antenna units, using the control device, a quality indicator, which is associated with a signal quality of the test signal received at the respective antenna unit, with reference to the test signal received in step (A); and (C) selecting for each of said antenna groups, using the control device, one of the antenna units, the quality indicator corresponding to which indicates an optimum signal quality from among the antenna units of the respective antenna group, to be a working antenna unit of the respective antenna group for performing subsequent data transmission.

Another object of the present invention is to provide the aforementioned antenna system.

Accordingly, the antenna system of the present invention comprises a plurality of antenna groups, each of which includes a plurality of antenna units, and a control device coupled electrically to the antenna groups. The control device is configured to control each of the antenna units of each of the antenna groups to receive one and the same test signal, to generate, for each of the antenna units, a quality indicator, which is associated with a signal quality of the test signal received at the respective antenna unit, with reference to the test signal received thereat, and to select, for each of the antenna groups, one of the antenna units, the quality indicator corresponding to which indicates an optimum signal quality from among the antenna units of the respective antenna group, to be a working antenna unit of the respective antenna group for performing subsequent data transmission.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
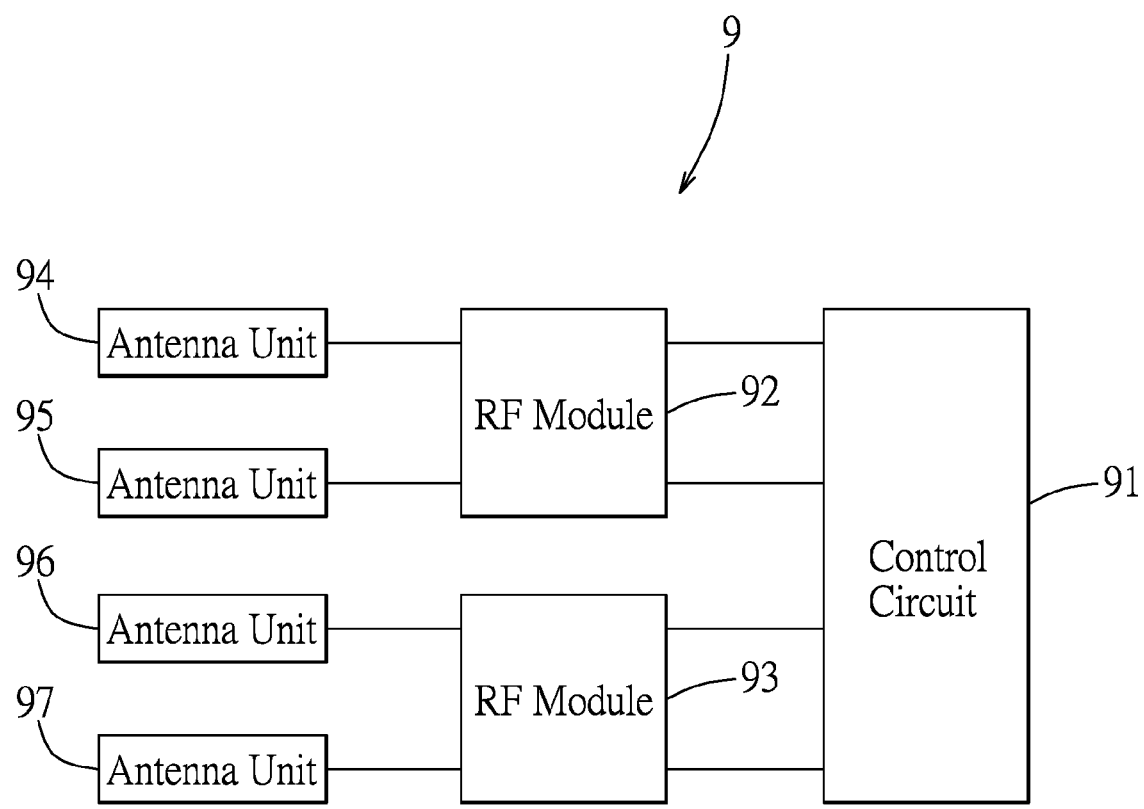
FIG. 1 is a schematic diagram illustrating a conventional antenna system.
Figure 2:
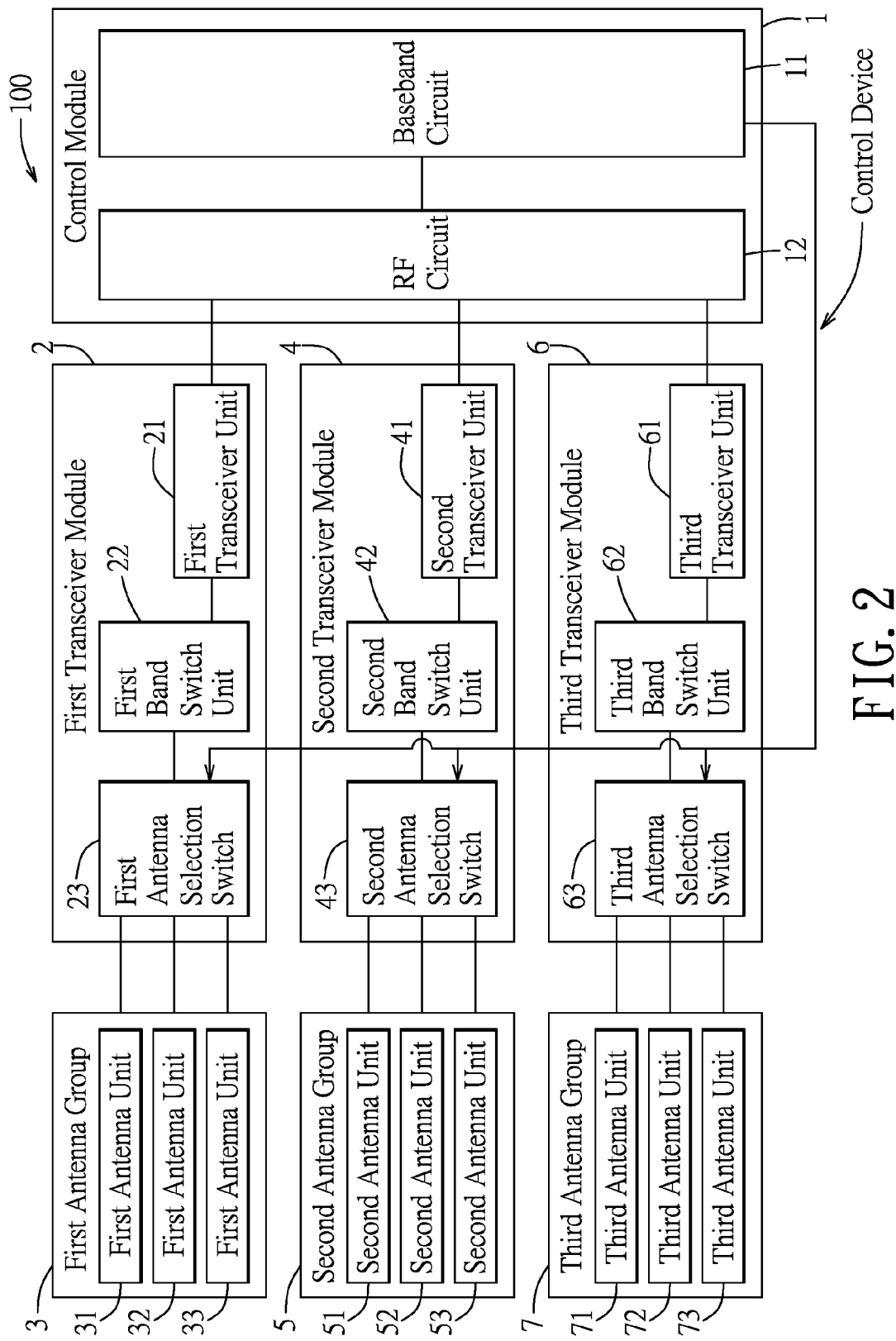
FIG. 2 is a schematic diagram illustrating an embodiment of an antenna system according to the present invention.

Referring to FIG. 2, an embodiment of an antenna system 100 according to the present invention is shown. The antenna system 100 is adapted to be applied in a wireless transmission device, such as a wireless router. However, the scope of application is not limited to the wireless transmission device disclosed herein.

The antenna system 100 comprises a plurality of antenna groups, i.e., a first antenna group 3, a second antenna group 5 and a third antenna group 7, and a control device coupled electrically to the plurality of antenna groups 3, 5, 7.

The control device includes a control module 1, and a plurality of transceiver modules, i.e., a first transceiver module 2, a second transceiver module 4 and a third transceiver module 6, corresponding in number and being connected respectively to the antenna groups 3, 5, 7. The control module 1 includes a baseband circuit 11, and a radio frequency (RF) circuit 12 connected to the baseband circuit 11 and the plurality of transceiver modules 2, 4, 6. In this embodiment, the baseband circuit 11 is a baseband integrated-circuit (IC), which is able to performing analog/digital signal processing and storage, and is able to output instructions to control operations of the RF circuit 12, the transceiver modules 2, 4, 6, and the antenna groups 3, 5, 7. The RF circuit 12 is an RF IC, which is able to perform processing and transmission of and conversion between baseband signals and RF signals. It is noted that implementations of the baseband circuit 11 and RF circuit 12 may be designed according to different needs, and are not limited to the aforementioned disclosure.

Each of the transceiver modules 2, 4, 6 includes an antenna selection switch, a band switch unit and a multi-band transceiver unit. In other words, the first transceiver module 2 includes a first antenna selection switch 23, a first band switch unit 22 and a first transceiver unit 21. The second transceiver module 4 includes a second antenna selection switch 43, a second band switch unit 42 and a second transceiver unit 41. The third transceiver module 6 includes a third antenna selection switch 63, a third band switch unit 62 and a third transceiver unit 61.

The transceiver units 21, 41, 61 are connected electrically to the RF circuit 12 and to the band switch units 22, 42, 62, respectively, and are configured to amplify, and transmit or receive wireless signals via the antenna groups 3, 5, 7, respectively.

The band switch units 22, 42, 62 are connected electrically to the transceiver units 21, 41, 61, respectively, and to the antenna selection switches 23, 43, 63, respectively. The baseband circuit 11 is configured to enable the RF circuit 12 to control each of the band switch units 22, 42, 62 to select an operating frequency band of a respective one of the transceiver units 21, 41, 61.

The antenna selection switches 23, 43, 63 are connected electrically to the band switch units 22, 42, 62, respectively, and to the antenna groups 3, 5, 7, respectively. Each of the antenna selection switches 23, 43, 63 is controlled by the baseband circuit 11 to set a working antenna unit of the respective one of the antenna groups 3, 5, 7 for operation. Detailed technical features associated with the working antenna unit will be elaborated in the following paragraphs.

It is noted that even though three transceiver modules 2, 4, 6 are given as an example for explaining the present invention, numbers and configurations of the transceiver modules 2, 4, 6 of the antenna system 100 may be adjusted according to different needs. The aforementioned recitation is merely provided for explanation of the embodiment of the present invention, and should not be deemed as limitations to the scope of the present invention.

In this embodiment, each of the antenna groups 3, 5, 7 includes three antenna units. In other words, the first antenna group 3 includes three first antenna units 31, 32, 33, the second antenna group 5 includes three second antenna units 51, 52, 53, and the third antenna group 7 includes three third antenna units 71, 72, 73. The first antenna units 31, 32, 33 are connected electrically to the first antenna selection switch 23 of the first transceiver module 2. The second antenna units 51, 52, 53 are connected electrically to the second antenna selection switch 43 of the second transceiver module 4. The third antenna units 71, 72, 73 are connected electrically to the third antenna selection switch 63 of the third transceiver module 6.

Each of the aforementioned antenna units 31-73 may be one of an internal antenna and an external antenna, and may be one of an antenna that supports full-band signal transmission and an antenna that only supports partial-band signal transmission. More specifically, frequency bands of the antenna units of each of the antenna groups 3, 5, 7 may be designed to be one of identical and complementary, such that full-band signal transmission may be realized by the antenna system 100. It is noted that even though three antenna units of each of the antenna groups 3, 5, 7 are given as an example for explaining the present invention, numbers of the antenna units may be adjusted according to different needs, and are not limited to the disclosure herein.

Figure 3:
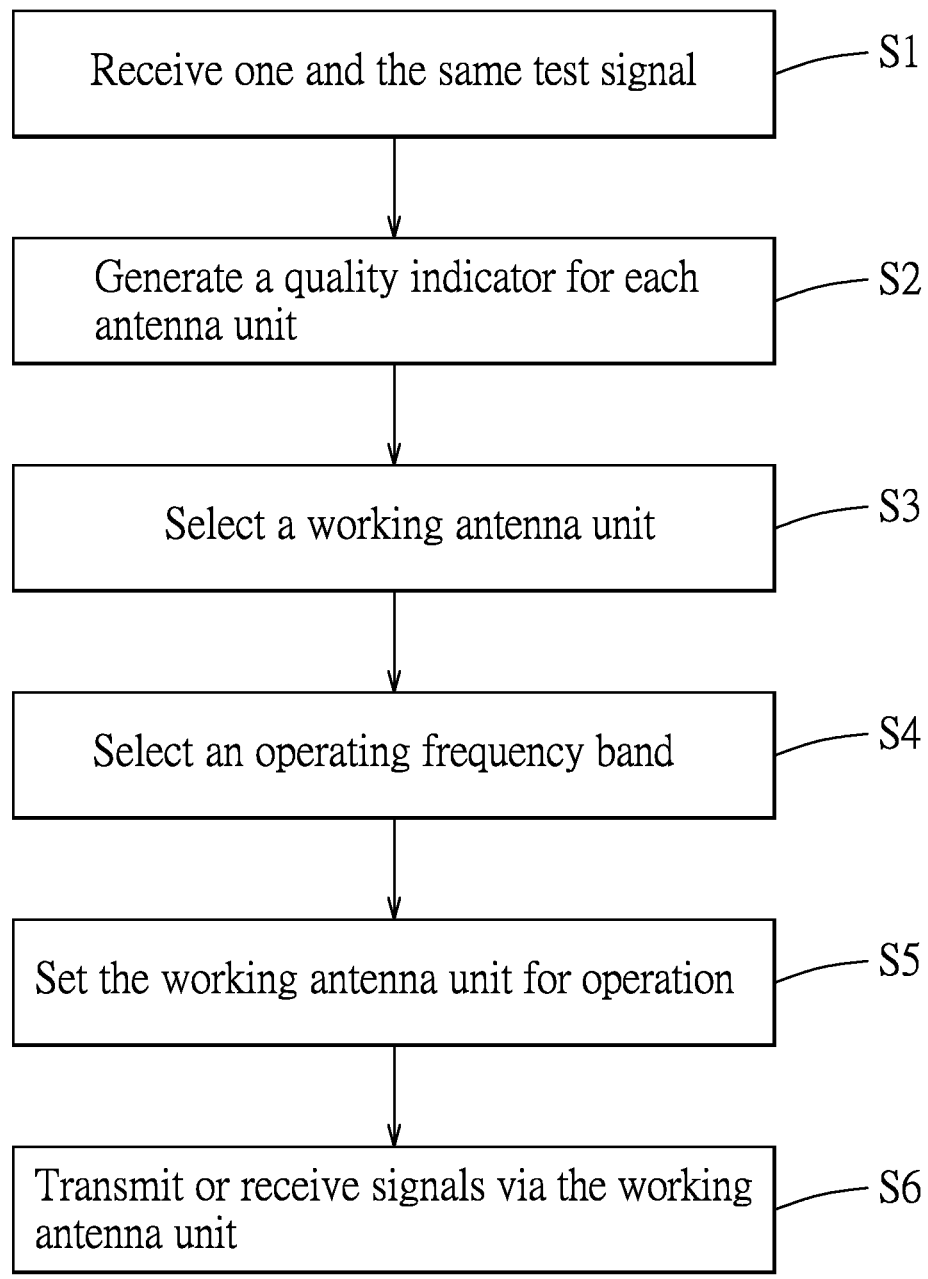
FIG. 3 is a flowchart illustrating steps of a method performed by a control device of the antenna system according to the present invention.

Referring to FIGS. 2 and 3, a flowchart illustrating steps of a method performed by the control device of the antenna system 100 according to the present invention for automatically setting optimum working antenna units is provided.

In step S1, the baseband circuit 11 of the control module 1 enables the first transceiver module 2 to control each of the first antenna units 31, 32, 33 of the first antenna group 3 to receive one and the same test signal, enables the second transceiver module 4 to control each of the second antenna units 51, 52, 53 of the second antenna group 5 to receive said one and the same test signal, and enables the third transceiver module 6 to control each of the third antenna units 71, 72, 73 of the third antenna group 7 to receive said one and the same test signal.

In step S2, the baseband circuit 11 of the control module 1 generates for each of the antenna units 31-73 a quality indicator, which is associated with a signal quality of the test signal received at the respective antenna unit 31-73, with reference to the test signal received in step S1. More specifically, for each of the antenna units 31-73, the baseband circuit 11 analyzes the antenna unit, and the test signal received at the antenna unit and transmitted via the corresponding transceiver module 2, 4 or 6, so as to generate the quality indicator, and stores the quality indicator thus generated. In this embodiment, the quality indicator is a signal-to-noise ratio of the test signal received at the respective antenna unit. Moreover, the signal quality is associated with communication quality of a channel on which the test signal received at the respective antenna unit is transmitted with respect to transmission of the test signal. The channel is defined by the respective antenna unit, the respective one of the transceiver modules 2, 4, 6, and the RF circuit 12 of the control module 1.

In this embodiment, steps of receiving the test signal, analyzing the test signal, and storage of the quality indicator are performed sequentially for each of the antenna units in one of the antenna groups 3, 5, 7, and subsequently, are performed sequentially for each of the antenna units in another one of the antenna groups 3, 5, 7.

For example, the baseband circuit 11 is set to perform the aforementioned steps on each of the antenna units of each of the antenna groups 3, 5, 7 in an order from the first antenna group 3, to the second antenna group 5 and to the third antenna group 7. Further, while the aforementioned steps are performed on each of the first antenna units 31-33 of the first antenna group 3, an order from the first antenna unit 31 to the first antenna unit 32 and to the first antenna 33 is followed. In other words, the baseband circuit 11 controls the first antenna selection switch 23 to set the first antenna unit 31 to receive the test signal. The test signal received at the first antenna unit 31 is transmitted via the first transceiver module 2 and the RF circuit 12 to the baseband circuit 11. The baseband circuit 11 then analyzes the test signal so as to obtain the signal-to-noise ratio of the test signal, and stores the signal-to-noise ratio thus obtained as the quality indicator corresponding to the first antenna unit 31, for the purpose of comparing the communication quality of the channels in the subsequent steps. Afterwards, the baseband circuit 11 performs analyses upon the test signal received at each of the antenna units 32-73, in an order from the first antenna units 32, 33, to the second antenna units 51, 52, 53 and to the third antenna units 71, 72, 73, so as to generate the corresponding quality indicators, and stores the quality indicators thus generated.

However, the aforementioned steps of receiving the test signal, analyzing the test signal, and storing the quality indicator are merely one exemplary implementation of this embodiment, which should not be limited to the disclosures in steps S1 and S2. For instance, analysis of the test signal and generation of the quality indicator corresponding to each of the antenna units 31-73 are not limited to be performed according to an order from the first antenna group 3, to the second antenna group 5 and to the third antenna group 7, and may be performed, for example, in an order from the first antenna unit 31, to the second antenna unit 51, to the third antenna unit 71, to the first antenna unit 32, to the second antenna unit 52, to the third antenna unit 72, and so forth, so as to achieve a similar effect.

Furthermore, even though the signal-to-noise ratio is given as an example for the quality indicator in this embodiment, the aforementioned steps of analyzing the test signal and generating the quality indicator are not limited to adopting the signal-to-noise ratio as an indicator for analysis.

In step S3, the baseband circuit 11 of the control module 1 is configured to select, for each of the antenna groups 3, 5, 7, one of the antenna units, the quality indicator corresponding to which indicates an optimum signal quality from among the antenna units of the respective antenna group, to be a working antenna unit of the respective antenna group for performing subsequent data transmission. More specifically, for each of the antenna groups 3, 5, 7, the baseband circuit 11 compares the quality indicators which correspond to the antenna units of the respective antenna group and which are stored in step S2, so as to select the working antenna unit. For example, the baseband circuit 11 may select the first antenna unit 31 of the first antenna group 3 to be the working antenna unit, and select the second antenna unit 52 and the third antenna unit 73 of a respective one of the second antenna group 5 and the third antenna group 7 to be the working antenna units.

Subsequently, the control module 1, by means of cooperations between the first transceiver module 2 and its corresponding working antenna unit (e.g., the first antenna unit 31), the second transceiver module 4 and its corresponding working antenna unit (e.g., the second antenna unit 52), and the third transceiver module 6 and its corresponding working antenna unit (e.g., the third antenna unit 73), may implement MIMO wireless signal transmission with the optimum antenna units.

More explicitly, in step S4, the baseband circuit 11 is configured to enable the RF circuit 12 to control the band switch unit 22, 42 or 62 of each of the transceiver modules 2, 4, 6 to select an operating frequency band of the respective transceiver unit 21, 41 or 61 according to the working antenna unit selected in step S3.

In step S5, the baseband circuit 11 is configured to control the antenna selection switch 23, 43 or 63 of each of the transceiver modules 2, 4, 6 to set the working antenna unit of the respective one of the antenna groups 3, 5, 7 for operation.

In step S6, the baseband circuit 11 enables the RF circuit 12 to control the transceiver unit 21, 41 or 61 of each of the transceiver modules 2, 4, 6 to transmit or receive signals via the working antenna unit of the respective one of the antenna groups 3, 5, 7.

Accordingly, the antenna system 100 which is disposed in an electronic device, such as a wireless router, by virtue of a test signal emitted from a wireless base station, may automatically perform the aforementioned steps S1 to S6, so as to ensure wireless transmission quality of the electronic device. Preferably, the aforementioned steps S1 to S6 may be automatically performed immediately after the electronic device is turned on, and is performed once again every predetermined time, so as to ensure that the electronic device maintains optimum wireless transmission quality. Further, aside from being performed automatically, steps S1 to S6 may be also performed in response to trigger of a switch of the electronic device by a user. Therefore, there are different kinds of timing for performing steps S1 to S6, and the timing should not be limited to the embodiment provided above.

In sum, the antenna system 100 of the present invention is able to automatically set the working antenna unit of each of the antenna groups 3, 5, 7 according to the quality indicator corresponding to each of the antenna units of the respective antenna group. This method ensures that the antenna system 100 automatically sets the optimum working antenna units for signal transmission based on the objective quality indicators. On the other hand, while the antenna system 100 performs MIMO signal transmission via the plurality of antenna units 31-73, selection of the working antenna units of the antenna groups 3, 5, 7 is not restricted to predetermined combinations of the antenna units, but instead may be realized by finding anyone of the antenna units, the quality indicator corresponding to which indicates an optimum signal quality from among the antenna units of the respective antenna group, for signal transmission. The aforesaid design may promote operational flexibility of the antenna system 100, so as to increase performance thereof.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for controlling an antenna system, the antenna system including a control device and a plurality of antenna groups, each of which includes a plurality of antenna units, the method comprising the steps of:
   (A) controlling, using the control device, each of the antenna units of each of the antenna groups to receive one and the same test signal;
   (B) generating for each of the antenna units, using the control device, a quality indicator, which is associated with a signal quality of the test signal received at the respective antenna unit, with reference to the test signal received in step (A); and
   (C) selecting for each of said antenna groups, using the control device, one of the antenna units, the quality indicator corresponding to which indicates an optimum signal quality from among the antenna units of the respective antenna group, to be a working antenna unit of the respective antenna group for performing subsequent data transmission.

2. The method as claimed in claim 1, the control device including a control module which includes a baseband circuit,
wherein, in step (B), for each of the antenna units, the baseband circuit analyzes the test signal received thereat so as to generate the quality indicator, and stores the quality indicator thus generated;
wherein, in step (C), for each of the antenna groups, the baseband circuit compares the quality indicators which correspond to the antenna units of the respective antenna group and which are stored in step (B), so as to select the working antenna unit.

3. The method as claimed in claim 2, the control device further including a plurality of transceiver modules that correspond in number and are connected respectively to the antenna groups, each of the transceiver modules including an antenna selection switch, a band switch unit and a transceiver unit, the control module further including a radio frequency (RF) circuit connected to the baseband circuit and the transceiver modules, the method further comprising the steps of:
(D) enabling, using the baseband circuit, the RF circuit to control the band switch unit of each of the transceiver modules to select an operating frequency band of the respective transceiver unit according to the working antenna unit selected in step (C);
(E) controlling, using the baseband circuit, the antenna selection switch of each of the transceiver modules to set the working antenna unit of the respective one of the antenna groups for operation; and
(F) enabling, using the baseband circuit, the RF circuit to control the transceiver unit of each of the transceiver modules to transmit or receive signals via the working antenna unit of the respective one of the antenna groups.

4. The method as claimed in claim 1, wherein, in step (B), the signal quality is associated with communication quality of a channel on which the test signal received at the respective antenna unit is transmitted with respect to transmission of the test signal.

5. The method as claimed in claim 4, the control device including a plurality of transceiver modules that correspond in number and are connected respectively to the antenna groups, and a control module that includes a radio frequency (RF) circuit,
wherein, in step (B), the channel is defined by the respective antenna unit, the respective one of the transceiver modules, and the RF circuit of the control module.

6. The method as claimed in claim 1, wherein in step (B), the quality indicator is a signal-to-noise ratio of the test signal received at the respective antenna unit.

7. An antenna system comprising:
a plurality of antenna groups, each of which includes a plurality of antenna units; and
a control device coupled electrically to said antenna groups, and configured to
control each of said antenna units of each of said antenna groups to receive one and the same test signal,
generate, for each of said antenna units, a quality indicator, which is associated with a signal quality of the test signal received at the respective antenna unit, with reference to the test signal received thereat, and
select, for each of said antenna groups, one of said antenna units, the quality indicator corresponding to which indicates an optimum signal quality from among said antenna units of the respective antenna group, to be a working antenna unit of the respective antenna group for performing subsequent data transmission.

8. The antenna system as claimed in claim 7, wherein said control device includes a control module which includes a baseband circuit, said baseband circuit being configured to:
for each of said antenna units, analyze the test signal received thereat so as to generate the quality indicator, and store the quality indicator thus generated; and
for each of said antenna groups, compare the quality indicators which correspond to said antenna units of the respective antenna group and which are stored thereby, so as to select said working antenna unit.

9. The antenna system as claimed in claim 8, wherein said control device further includes a plurality of transceiver modules corresponding in number and being connected respectively to said antenna groups, each of said transceiver modules including an antenna selection switch, a band switch unit and a transceiver unit, said control module further including a radio frequency (RF) circuit connected to said baseband circuit and said transceiver modules, said baseband circuit being further configured to:
enable said RF circuit to control said band switch unit of each of said transceiver modules to select an operating frequency band of the respective transceiver unit according to said working antenna unit selected thereby;
control said antenna selection switch of each of said transceiver modules to set said working antenna unit of the respective one of said antenna groups for operation; and
enable said RF circuit to control said transceiver unit of each of said transceiver modules to transmit or receive signals via said working antenna unit of the respective one of said antenna groups.

10. The antenna system as claimed in claim 7, wherein the signal quality is associated with communication quality of a channel on which the test signal received at the respective antenna unit is transmitted with respect to transmission of the test signal.

11. The antenna system as claimed in claim 10, wherein said control device includes a plurality of transceiver modules corresponding in number and being connected respectively to said antenna groups, and a control module including a radio frequency (RF) circuit,
wherein the channel is defined by the respective antenna unit, the respective one of said transceiver modules, and said RF circuit of said control module.

12. The antenna as claimed in claim 7, wherein the quality indicator is a signal-to-noise ratio of the test signal received at the respective antenna unit.

* * * * *